I. H. PLEUKHARP.
TRANSMISSION GEARING FOR MOTOR VEHICLES.
APPLICATION FILED AUG. 10, 1914.

1,133,744.

Patented Mar. 30, 1915.
2 SHEETS—SHEET 1.

Inventor:
Irvin H. Pleukharp,

I. H. PLEUKHARP.
TRANSMISSION GEARING FOR MOTOR VEHICLES.
APPLICATION FILED AUG. 10, 1914.

1,133,744.

Patented Mar. 30, 1915.
2 SHEETS—SHEET 2.

Witnesses:

Inventor:
Irvin H. Pleukharp,
By Dyrenforth, Lee, Chritton & Wiles
Attys.

UNITED STATES PATENT OFFICE.

IRVIN H. PLEUKHARP, OF COLUMBUS, OHIO.

TRANSMISSION-GEARING FOR MOTOR-VEHICLES.

1,133,744.  Specification of Letters Patent.  Patented Mar. 30, 1915.

Application filed August 10, 1914. Serial No. 856,046.

*To all whom it may concern:*

Be it known that I, IRVIN H. PLEUKHARP, a citizen of the United States, residing at Columbus, in the county of Franklin and State of Ohio, have invented a new and useful Improvement in Transmission-Gearing for Motor-Vehicles, of which the following is a specification.

My invention relates to certain new and useful improvements in transmission gearing for motor vehicles, and is fully described and explained in the specification and shown in the accompanying drawings, in which—

Figure 1:
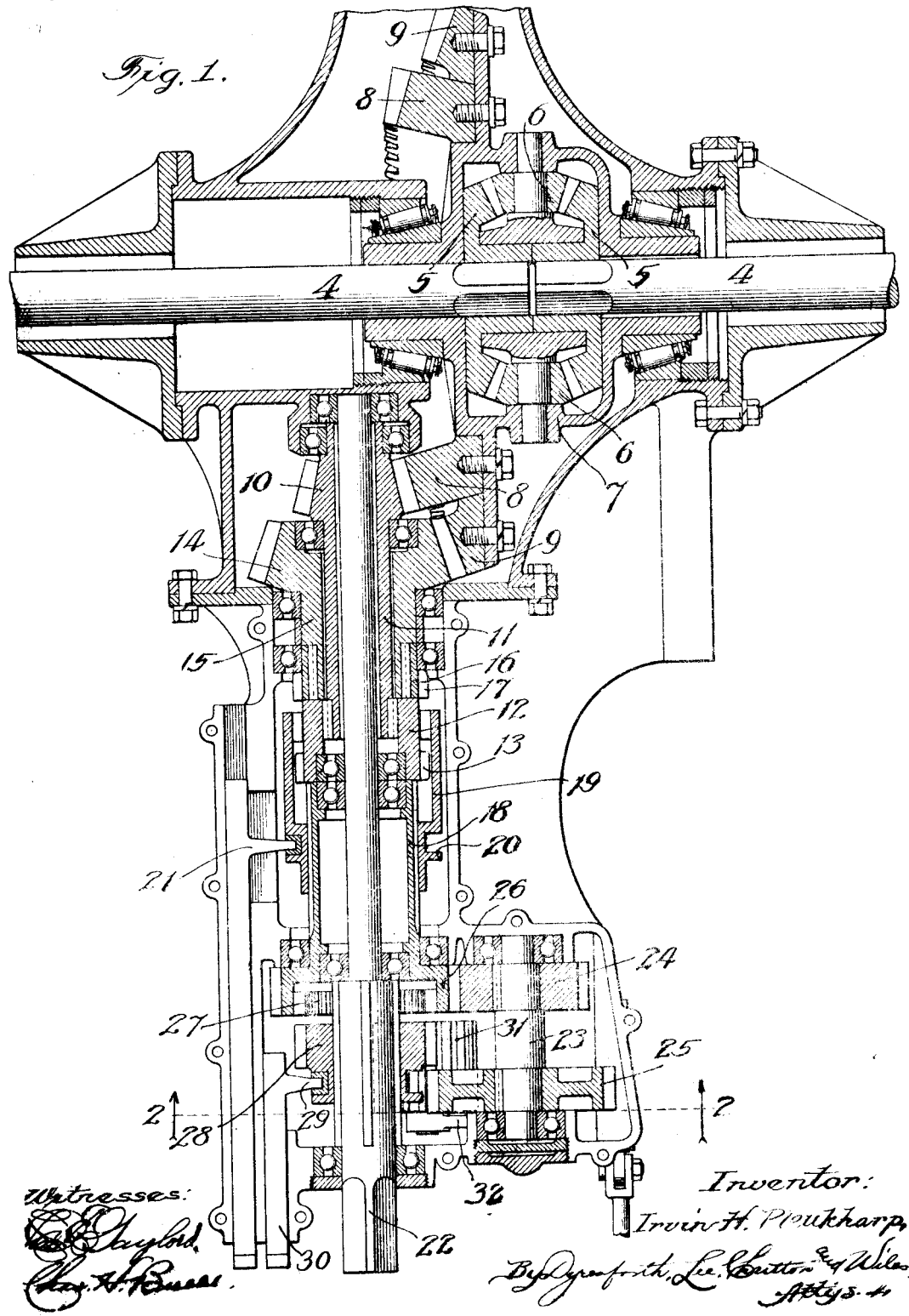
Figure 2:
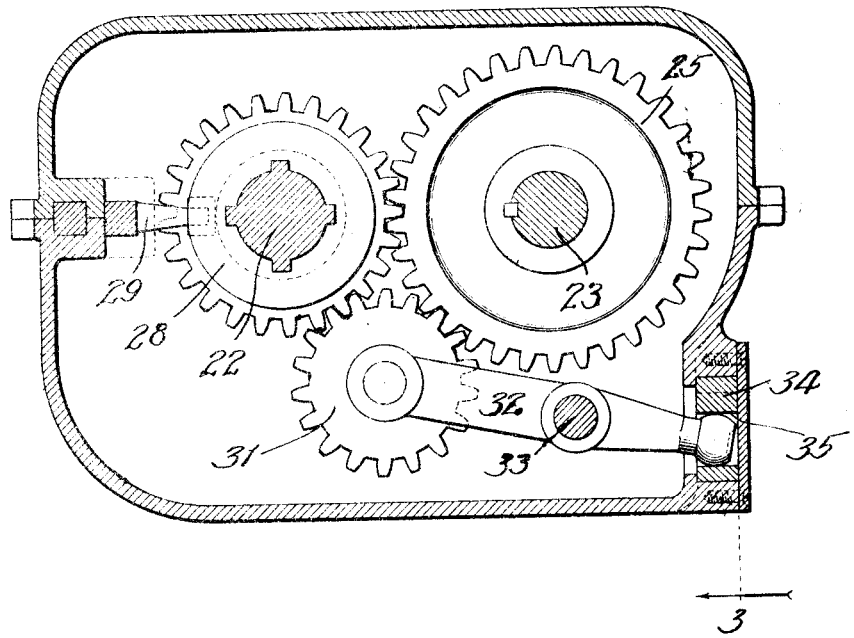
Figure 3:
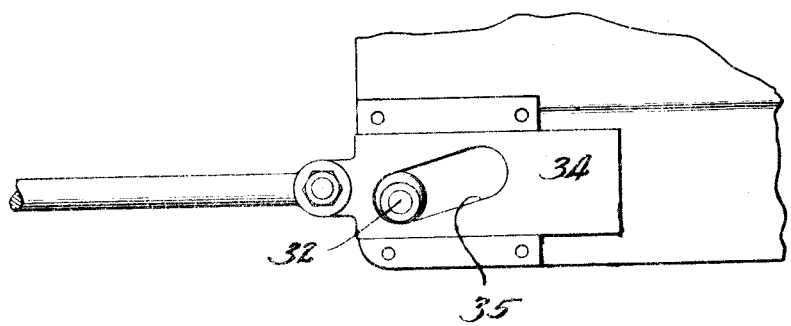

Figure 1 is a horizontal section through my device, showing its most important part; Fig. 2 is a section on the line 2 of Fig. 3, and Fig. 3 is a section on the line 3 of Fig. 2.

Referring to the drawings, the two parts of the rear axle or driven shaft are indicated by the numerals 4, each of said parts having fast upon it a pinion 5 forming part of the differential gearing.

The intermediate pinions of the differential are indicated at 6, the same being carried in the usual manner by spindles mounted upon a rotary member 7. The member 7 has attached to it two large annular gears 8 and 9, by which it may be driven. The gear 8 meshes with a pinion 10 which is provided with an integral sleeve or hub 11 upon the forward end of which is keyed an enlarged part 12 supplied with a series of external clutch-teeth 13.

Surrounding the sleeve 11 is a pinion 14 in mesh with the large gear 9. This pinion terminates in an integral sleeve 15 upon the exterior surface of which, at its forward end, is mounted a sleeve 16 provided with clutch-teeth 17.

18 is a sleeve forming an intermediate driving member and upon which is mounted a clutch-member 19, provided with a groove 20 to be engaged by a finger on a shifter member 21. The clutch member 19 overhangs the clutch-teeth 13 on the sleeve 11, so as to lie between these clutch-teeth 13 and the clutch-teeth 17 on the sleeve 15. It will thus be manifest that by shifting the clutch member 19 forward or back, the sleeve 18 can be clutched to either of the pinions 10 or 14, so as to drive the intermediate part of the differential through the medium of either of the large gears 8 and 9 connected thereto. By this means, two different speeds are imparted to the driving mechanism.

The sleeve 18 itself can be driven at two different speeds by mechanism which will now be described. This manifestly results in four possible forward speeds of the vehicle. 22 is the main driving shaft of the vehicle, the same being clutch-connected to the prime-mover in the usual manner. Adjacent to this shaft is a counter-shaft 23 upon which are two gears 24 and 25. The gear 24 is permanently in mesh with gear teeth cut on an enlarged boss 26 on the rear end of the sleeve 18. The inside of this boss 26 is provided with other gear teeth 27. 28 is a gear keyed to the main drive-shaft and which can be shifted longitudinally. When it is shifted backward, its teeth engage with the internal teeth on the boss 26 so as to produce a direct drive. In other words, these gear teeth simply act as clutch-teeth when the pinion 28 is shifted backward. The parts are shown in neutral position in the drawings, but when the gear 28 is drawn forward, it will engage with the gear 25 so that the sleeve 18 is driven from the main shaft through the counter-shaft 23 and, therefore, at considerably slower speed. The gear 28 may be shifted longitudinally through the medium of a finger 29 on a shifting member 30. Thus, in a very simple manner, I obtain the four desired forward speeds of the vehicle.

In order to get a reverse speed, I provide underneath the position which the gear 28 occupies when in neutral position, and also under the gear 25 on the counter-shaft 23, an auxiliary pinion 31 carried on the end of a lever 32, fulcrumed at 33 and adapted to be raised and lowered by longitudinally shifting a plate 34 having a diagonally-disposed cam-slot 35 to engage with the end of the lever 32. The auxiliary pinion 31 is of double the length of the pinions 28 and 25 and, therefore, when elevated will engage with both simultaneously. Therefore, to drive the vehicle in a reverse direction, it is necessary only to elevate this auxiliary pinion, while the gear 28 is in its neutral position.

My present structure is particularly advantageous because of its small size, the small number of parts which it contains and the fact that the entire transmission gear is consolidated in the single transmission housing and is, or can be, located substantially in the center of the rear axle. The simplicity and relative cheapness of the structure as compared with those constructions now in common use, will be evident from inspection.

I have not illustrated any particular means for controlling the gear-shifting member, since any ordinary system of levers can be employed, or if desired one of the less usual systems, such as electrical or pneumatic gear shifters can be adapted to this arrangement.

I realize that considerable variation is possible in the details of this construction without departing from the spirit of my invention; therefore, I do not intend to limit myself to the specific form herein shown and described.

What I claim as new and desire to secure by Letters Patent is:—

1. In transmission gearing, the combination with a driven shaft and a pair of bevel gears secured thereto, of a driving system, including an inner driving pinion meshing with one of the bevel gears and having an extended hub, an outer driving pinion sleeved upon the hub of the inner pinion and meshing with the other bevel gear, a clutch-member connected with the outer driving pinion, a clutch-member connected with the hub of the inner driving pinion, an intermediate driving member in alinement with but independent of said pinions, a clutch-member slidably connected with the inner end of said intermediate driving member and adapted to selectively engage the clutches of either of said pinions, a second clutch member and a gear wheel connected with the outer end of said intermediate driving member, a driving shaft in alinement with but independent of said intermediate driving member, a counter-shaft parallel with the driving shaft and intermediate driving member, a gear on said counter-shaft meshing with the gear on said intermediate driving member, a second gear mounted on said counter-shaft, and a combined gear and clutch member slidably mounted on said driving shaft and adapted to selectively engage either the second gear of the counter-shaft, or the clutch at the outer end of the intermediate driving member.

2. In transmission gearing, the combination with a driven shaft and a pair of bevel gears secured thereto, of a driving system, including a driving pinion meshing with one of the bevel gears and a driving pinion sleeved upon the first driving pinion and meshing with the other of said driving gears, clutch means associated with each of said pinions, an intermediate driving member in alinement with but independent of said pinions, clutch means associated with said intermediate driving member and adapted to selectively engage the clutches of either of said pinions, a driving shaft in alinement with but independent of said intermediate driving member, a counter-shaft parallel with said driving shaft and intermediate driving member, a gear-train connecting said driving shaft with said intermediate driving member through said counter-shaft, means for throwing said gear-train out of operation, and means for clutching said driving shaft directly to said intermediate driving member.

3. In transmission gearing, the combination with a driven shaft and a pair of bevel gears secured thereto, of a driving system, including a driving shaft, a pinion sleeved upon said driving shaft and meshing with one of said bevel gears, a second pinion sleeved upon said driving shaft and meshing with the other of said driving gears, clutch means associated with each of said pinions, an intermediate driving member sleeved upon said driving shaft and having clutch means adapted to be selectively engaged with the clutch-members of either of said pinions, a counter-shaft paralleling said driving shaft, a gear-train for driving said intermediate driving member from said driving shaft, and means for driving said intermediate member directly from said driving shaft.

4. In transmission gearing, the combination with a driven shaft and a pair of bevel gears secured thereto, of a driving system, including a driving shaft, a pinion sleeved upon said driving shaft and meshing with one of said bevel gears, a second pinion sleeved upon said first pinion and meshing with the other of said bevel gears, clutch members associated with each of said pinions, an intermediate driving member in alinement with but independent of said pinions and also sleeved upon said driving shaft, a clutch device associated with said intermediate driving member and adapted to selectively engage the clutches of either of said pinions, a gear on said intermediate driving member, a gear on said driving shaft, a counter-shaft paralleling said driving shaft, a gear carried on said counter-shaft and meshing with the gear of the intermediate driving member, a second gear carried on said counter-shaft, and adapted to mesh with the gear of said driving shaft, and means for clutching said driving shaft directly to said intermediate driving member.

5. In transmission gearing, the combination with a driven shaft and a pair of bevel gears secured thereto, of a driving system, including a driving pinion meshing with one of the bevel gears and having an extended hub, the second driving pinion sleeved upon said hub and meshing with the other of said driving gears, clutch means associated with each of said pinions, an intermediate driving member in alinement with but independent of said pinions, a clutch device associated with said intermediate driving member and adapted to selectively engage it with either of the said pinions, a driving shaft in alinement with but independent of said intermediate driving member, means for clutching said driving shaft directly to said intermediate driving member, a gear-train for forming indirect connection between said driving shaft and said intermediate driving member, said gear-train including selective means for reversing the direction of motion of said intermediate driving member with relation to said driving shaft.

6. In transmission gearing, the combination with a driven shaft and a pair of bevel gears secured thereto, of a driving system, including a driving shaft, a pinion sleeved upon said driving shaft and engaging one of said bevel gears, a second pinion sleeved upon said first pinion and engaging the other bevel gear, clutch means associated with each of said pinions, an intermediate driving member in alinement with but independent of said pinions, said intermediate driving member being sleeved upon said driving shaft, a clutch slidable upon said intermediate driving member and adapted to selectively engage the clutches of either of said pinions, an external gear member and an internal clutch member formed on said intermediate driving member, a counter-shaft parallel with said driving shaft and said intermediate driving member, a plurality of gears mounted upon the counter shaft, one of said gears meshing with the external gear of said intermediate driving member, a gear splined upon said driving shaft and adapted to selectively engage either a gear upon the counter-shaft or the internal clutch of the intermediate driving member.

7. In combination, a driven shaft, a plurality of bevel gears secured thereto, a plurality of coaxial bevel pinions, each meshing with one of said bevel gears, a driving shaft in alinement with the axis of said bevel pinions, an intermediate driving member interposed between said driving shaft and said bevel pinions and having clutch means associated therewith and adapted to selectively engage any of the bevel pinions, a counter-shaft arranged parallel with the driving shaft, a plurality of gear wheels mounted on the counter-shaft, a gear wheel on the intermediate driving member meshing with one of the gears on the counter-shaft, a slidable gear mounted on the driving shaft and adapted to selectively engage either a gear upon the counter-shaft or directly with the intermediate driving member, a rocker arm, a reverse pinion mounted in one end of said rocker arm and adapted to mesh with the gear of said driving shaft and one of the gears of said counter-shaft, and means for operating the other end of said rocker arm.

8. In transmission gearing, the combination with a driven shaft and a pair of bevel gears secured thereto, of a driving system, including a driving pinion meshing with one of the bevel gears and having an extended hub, a second driving pinion sleeved upon the hub of the inner pinion and meshing with the other bevel gear, a clutch member formed separately from but engaged with said second pinion and having external clutch teeth, a second clutch member formed separately from but engaged with the hub of said first pinion and having external clutch teeth spaced from the teeth of said first clutch member, an intermediate driving sleeve in alinement with but independent of said pinions, a clutch sleeve splined upon said intermediate driving sleeve and carrying an overhanging portion formed with internal clutch teeth which lie within the space between the external clutch teeth of said pinion clutch members, means for shifting said splined clutch sleeve to engage selectively either of said pinion clutch members, a driving shaft in alinement with but independent of said intermediate driving sleeve, a counter-shaft parallel with said driving shaft, a gear-train for connecting said driving shaft with said intermediate driving sleeve to said counter-shaft, selective means for transmitting the drive either through said gear-train or directly from said driving shaft to said intermediate driving sleeve, and means for reversing the rotation of said intermediate driving sleeve with relation to said driving shaft.

9. In transmission gearing, the combination with a driven shaft and a pair of bevel gears secured thereto, of a driving system, including a driving shaft, an inner driving pinion freely mounted upon said driving shaft, meshing with one of said bevel gears, and having an extended hub, an outer driving pinion sleeved upon the hub of the inner pinion and meshing with the other bevel gear, a clutch member connected with the outer driving pinion, a clutch member connected with the hub of the inner driving pinion, an intermediate driving member in alinement with but independent of said pinions, a clutch member slidably connected with said intermediate driving member and adapted to selectively engage the clutches of either of said pinions, means for shifting said clutch member to effect such engagement, an overhanging flange formed on the outer end of said intermediate driving member, internal and external gear teeth on said flange, a driving shaft in alinement with but independent of said intermediate driving member, a counter-shaft parallel with the driving shaft and the intermediate driving member, a gear on said counter-shaft meshing with the external gear-teeth on said intermediate driving member, a second gear mounted on said counter-shaft, a combined gear and clutch member slidably mounted on said driving shaft and adapted to selectively engage either the internal teeth of the flange to form a direct drive connection, or the second gear on the counter-shaft to form a gear drive connection, a rocking arm mounted to swing toward and away from said driving shaft and counter-shaft, a reverse pinion carried by the end of said rocker arm and adapted for engagement with the gear on the driving shaft and the gear on the counter-shaft to reverse the direction of rotation of the latter, a slidable cam engaging the other end of the lever to move the reverse gear into and out of mesh, and means for operating said cam.

10. In transmission gearing, the combination with a driven shaft and a pair of bevel gears secured thereto, of a driving system, including a pair of coaxial driving pinions meshing each with one of said bevel gears, a tubular intermediate driving member in alinement with but independent of said driving pinions, a clutch member splined upon said intermediate driving member and adapted for selective engagement with either of said driving pinions, a driving shaft in alinement with said intermediate driving member, and extending through the bore of the same to provide bearings therefor, a flange formed on the end of the intermediate driving member and overhanging the driving shaft, internal and external gear teeth formed in the flange, a counter-shaft parallel with the driving shaft, a gear on the counter-shaft meshing with the external gear of the intermediate driving member, a second gear on the counter-shaft, a gear splined upon the driving shaft to selectively engage either the second gear of the counter-shaft or the internal gear of the intermediate driving member, and a reversing pinion adapted to be brought into engagement with the gear on the driving shaft and the second gear on the counter-shaft.

IRVIN H. PLEUKHARP.

In presence of—
 E. H. HUGGINS,
 JULIA SINNOTT.